United States Patent
Taylor (10) Patent No.: US 9,719,426 B2
(45) Date of Patent: Aug. 1, 2017

(54) MOUNTING ARRANGEMENT

(71) Applicant: ROLLS-ROYCE PLC, London (JP)

(72) Inventor: Benjamin Taylor, Norwich (GB)

(73) Assignee: ROLLS-ROYCE plc, London (GB)

( * ) Notice: Subject to any disclaimer, the term of this patent is extended or adjusted under 35 U.S.C. 154(b) by 530 days.

(21) Appl. No.: 14/177,665

(22) Filed: Feb. 11, 2014

(65) Prior Publication Data

US 2014/0305136 A1 Oct. 16, 2014

(30) Foreign Application Priority Data

Apr. 10, 2013 (GB) .................. 1306482.9

(51) Int. Cl.
*F02C 7/20* (2006.01)
*F01D 25/28* (2006.01)
*F02C 7/32* (2006.01)
*B60R 16/02* (2006.01)
*H02G 3/02* (2006.01)
(Continued)

(52) U.S. Cl.
CPC ............... *F02C 7/20* (2013.01); *F01D 25/28* (2013.01); *F02C 7/222* (2013.01); *F02C 7/32* (2013.01); *B60K 15/01* (2013.01); *B60R 16/0215* (2013.01); *F05D 2240/91* (2013.01); *F05D 2260/36* (2013.01); *F05D 2260/98* (2013.01); *H02G 3/02* (2013.01); *Y02T 50/672* (2013.01); *Y10T 29/4932* (2015.01); *Y10T 29/49826* (2015.01)

(58) Field of Classification Search
CPC .... F02C 7/20; F02C 7/32; F02C 7/222; F01D 25/14; F01D 25/24; F01D 25/243; F01D 25/28; F05D 2230/51; F05D 2240/91; F05D 2260/36; B60K 15/01–15/013; B60R 16/0215–16/0222; B60R 16/08; B23P 11/00; Y10T 29/4932; Y10T 29/49622; Y10T 29/49947

See application file for complete search history.

(56) References Cited

U.S. PATENT DOCUMENTS

| 3,494,657 A | 2/1970 | Tantlinger et al. |
| 3,710,568 A | 1/1973 | Rice |
| 3,818,659 A | 6/1974 | Anderson |

(Continued)

FOREIGN PATENT DOCUMENTS

| EP | 2 607 651 A2 | 6/2013 |
| EP | 2 607 653 A2 | 6/2013 |

(Continued)

OTHER PUBLICATIONS

Mar. 27, 2015 Search Report issued in European Application No. 14 15 4630.

(Continued)

*Primary Examiner* — Christopher Besler
*Assistant Examiner* — Matthew P Travers
(74) *Attorney, Agent, or Firm* — Oliff PLC (57) ABSTRACT

A gas turbine engine is provided that has a rigid dressing raft mounted to a rigid part of the gas turbine engine. The rigid dressing raft includes at least a part of a component or system of the gas turbine engine. For example, the rigid dressing raft may have electrical conductors embedded therein that are a part of the electrical system of the gas turbine engine.

13 Claims, 6 Drawing Sheets

(51) Int. Cl.
*F02C 7/22* (2006.01)
*B60K 15/01* (2006.01)

(56) References Cited

U.S. PATENT DOCUMENTS

| | | | |
|---|---|---|---|
| 5,174,110 A | 12/1992 | Duesler et al. | |
| 5,431,517 A * | 7/1995 | Hoelle | F01D 25/24 |
| | | | 29/512 |
| 7,805,949 B2 * | 10/2010 | Mazeaud | F01D 9/065 |
| | | | 244/129.4 |
| 8,240,979 B2 * | 8/2012 | Jain | F01D 25/14 |
| | | | 415/115 |
| 2004/0266274 A1 | 12/2004 | Naudet et al. | |
| 2007/0029454 A1 | 2/2007 | Suttie et al. | |
| 2007/0234706 A1 | 10/2007 | Gagneux et al. | |
| 2013/0160464 A1 * | 6/2013 | Maszczk | F02C 7/20 |
| | | | 60/796 |
| 2014/0050571 A1 * | 2/2014 | Sauerhoefer | F01D 25/243 |
| | | | 415/182.1 |
| 2014/0075957 A1 * | 3/2014 | Boehne | F02C 7/00 |
| | | | 60/797 |

FOREIGN PATENT DOCUMENTS

| | | |
|---|---|---|
| FR | 2 927 954 A1 | 8/2009 |
| WO | 93/06343 A1 | 4/1993 |
| WO | 2007/064388 A1 | 6/2007 |
| WO | WO 2010/122120 A1 | 10/2010 |

OTHER PUBLICATIONS

Oct. 10, 2013 Search Report issued in United Kingdom Patent Application No. 1306482.9.

* cited by examiner

MOUNTING ARRANGEMENT

CROSS-REFERENCE TO RELATED APPLICATIONS

This application is based upon and claims the benefit of priority from British Patent Application Number 1306482.9 filed 10 Apr. 2013, the entire contents of which are incorporated by reference.

BACKGROUND OF THE INVENTION

1. Field of the Disclosure

The disclosure relates to an assembly aid for mounting an engine dressing raft to a gas turbine engine.

2. Description of the Related Art

A typical gas turbine engine has a substantial number of electrical components which serve, for example, to sense operating parameters of the engine and/or to control actuators which operate devices in the engine. Such devices may, for example, control fuel flow, variable vanes and air bleed valves. The actuators may themselves be electrically powered, although some may be pneumatically or hydraulically powered, but controlled by electrical signals.

Electrical power, and signals to and from the individual electrical components, is commonly transmitted along conductors. Conventionally, such conductors may be in the form of wires and/or cables which are assembled together in a harness. In such a conventional harness, each wire may be surrounded by an insulating sleeve, which may be braided or have a braided cover.

Figure 1:
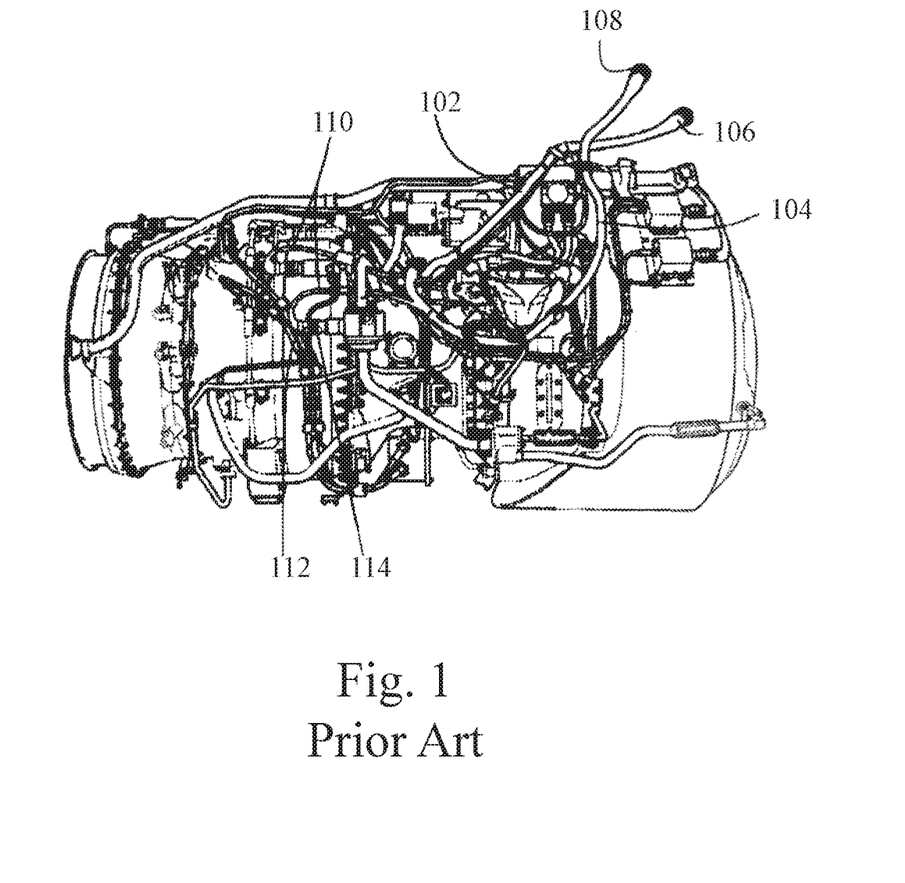
FIG. 1 shows a gas turbine engine with a conventional harness.

By way of example, FIG. 1 of the accompanying drawings shows a typical gas turbine engine including two conventional wiring harnesses 102, 104, each provided with a respective connector component 106, 108 for connection to circuitry, which may be for example accommodated within the airframe of an aircraft in which the engine is installed.

The harnesses 102, 104 are assembled from individual wires and cables which are held together over at least part of their lengths by suitable sleeving and/or braiding. Individual wires and cables, for example those indicated at 110, emerge from the sleeving or braiding to terminate at plug or socket connector components 112 for cooperation with complementary socket or plug connector components 114 on, or connected to, the respective electrical components.

Each conventional harness 102, 104 comprises a multitude of insulated wires and cables. This makes the conventional harness itself bulky, heavy and difficult to manipulate. The conventional harnesses occupy significant space within a gas turbine engine (for example within the nacelle of a gas turbine engine), and thus may compromise the design of the aircraft, for example the size and/or weight and/or shape of the nacelle.

Conventional harnesses comprise a large number of components, including various individual wires and/or bundles of wires, supporting components (such as brackets or cables) and electrical and/or mechanical connectors. This can make the assembly process complicated (and thus susceptible to errors) and/or time consuming. Disassembly of the conventional harnesses (for example removal of the conventional harnesses from a gas turbine engine during maintenance) may also be complicated and/or time consuming. Thus, in many maintenance (or repair or overhaul) procedures on a gas turbine engine, removal and subsequent refitting of the conventional electrical harness may account for a very significant portion of the operation time and/or account for a significant proportion of the potential assembly errors.

The electrical conductors in the conventional harnesses may be susceptible to mechanical damage. For example, mechanical damage may occur during installation (for example through accidental piercing of the protective sleeves/braiding) and/or during service (for example due to vibration). In order to reduce the likelihood of damage to the conductors in a conventional harness, the protective sleeves/braiding may need to be further reinforced, adding still further weight and reducing the ease with which they can be manipulated. Similarly, the exposed electrical connectors used to connect one conductor to another conductor or conductors to electrical units may be susceptible to damage and/or may add significant weight to the engine.

In addition to the electrical systems, a gas turbine engine comprises various other systems that are critical to and necessary for the functioning of the engine. Such systems include, for example, fluid systems including gas and liquid systems.

In general, the components of the various support systems (such as electrical and/or fluid systems) that are provided to the engine referred to as engine dressings. At least some of the engine dressings are conventionally provided on casings of a gas turbine engine, such as a fan case. Conventional arrangements of engine dressings, in which the various systems and components thereof are individually attached to the engine in a number of different manual operations are time consuming, susceptible to errors, and may result in at least some parts of the dressing being damaged.

OBJECTS AND SUMMARY

It is desirable to address at least one of the drawbacks associated with conventional engine dressings, including simplifying the process for providing dressings to an engine.

According to an aspect, there is provided an assembly for a gas turbine engine comprising a rigid dressing raft comprising at least a part of a component or system of the gas turbine engine. The assembly comprises a rigid support structure that forms a part of the gas turbine engine. The rigid dressing raft comprises a raft location fixing. The rigid support structure comprises a complimentary support structure location fixing. The raft location fixing and the complimentary support structure location fixing comprise corresponding profiled surfaces that are engaged so as to locate the rigid dressing raft relative to the rigid support structure.

There is also provided such an assembly for a vehicle, in which the rigid dressing raft comprises at least a part of a component or system of the vehicle, and the rigid support structure forms a part of the vehicle.

There is also provided a method of connecting a rigid dressing raft of a gas turbine engine to a support structure of the gas turbine engine, the rigid dressing raft comprising at least a part of a component or system of the gas turbine engine. The method comprises engaging a profiled surface of a raft location fixing of the rigid dressing raft with a corresponding profiled surface of a complimentary support structure location fixing of the rigid support structure so as to locate the rigid dressing raft relative to the rigid support structure. Optionally, the method may also comprise fixing the raft location fixing to the support structure location fixing.

Accordingly, there is provided a convenient method and apparatus for providing component and/or systems (which may be referred to more generally as dressings) to a gas turbine engine using a rigid dressing raft. The rigid dressing raft allows dressing(s) to be provided to the engine using a vastly simplified process, with a resulting reduction in construction time and complexity, and lower chance of errors and/or damage occurring. Multiple components/systems (or parts thereof) can be provided using a single raft, thereby further simplifying the provision of engine dressing, and making the dressings more robust. It will be appreciated that the term raft may be used herein simply to refer to a structure as described and/or claimed herein, and thus the terms raft and structure may be interchangeable.

The shape of the engaging profiled surfaces may be such that the two engaging surfaces can only properly engage at one position of the rigid dressing raft relative to the rigid support structure. For example, the shape of the engaging profiled surfaces may be such that the engaging surfaces are only engaged across their full extent at one position of the rigid dressing raft relative to the rigid support structure. The profiled surfaces may be shaped so as to locate the rigid dressing raft relative to the rigid support structure in at least two orthogonal directions, for example two or three orthogonal directions. By way of example, the profiled shapes may comprise ramps and/or curved surfaces, and/or may be symmetrical about their midpoints, for example a plane that passes through the midpoint of the profiled surface and is perpendicular to a tangent to the profiled surface at the midpoint.

The complimentary raft location fixing and support structure location fixing allow the rigid dressing raft to be located relative to (and optionally fixed to) the support structure in a straightforward, reliable, and accurate manner. Using the raft location fixing and support structure location fixing may allow the raft to be located in position quickly and accurately with few operators, for example only one or two operators may be required.

The rigid dressing raft may be referred to herein simply as a raft, and the rigid support structure may be referred to herein simply as a support structure.

One of the raft location fixing and the support structure location fixing may comprise a channel with its respective profiled surface forming the base of the channel. The other of the location fixing and the support structure location fixing may comprise a location tab that locates inside the channel such that its respective profiled surface engages with the profiled surface forming the base of the channel.

Providing one of the location fixings with a channel may provide a particularly secure and/or accurate location of the raft to the support structure. For example, it may provide location of the raft relative to the support structure in at least two orthogonal directions.

The location fixing comprising the channel may be the support structure location fixing. This may allow the raft location fixing to be a tab feature, which may be simpler and easier to manufacture.

The raft location feature may be integral with the raft. For example, the raft location feature may be manufactured using the same material and/or during the same process as the raft.

The support structure location fixing may be a dedicated bracket that is connected to the rigid support structure. This may allow the support structure location fixing to be manufactured independently of the support structure itself, thereby simplifying the manufacture of the parts and allowing their properties to be optimised for their respective functions.

Accordingly, there is also provided a bracket for locating a rigid dressing raft comprising at least a part of a component or system of a vehicle relative to a rigid support structure that forms a part of the vehicle. The bracket comprises a profiled surface that is arranged to engage with a corresponding profiled surface of a raft location fixing of the rigid dressing raft so as to locate the rigid dressing raft relative to the rigid support structure. The bracket may also be used to fix the rigid dressing raft to the support structure, for example using a suitable fixing member, such as a bolt.

The bracket may facilitate the advantages of providing engine dressings using a rigid dressing raft connected to a support structure using the location fixings as described herein. The bracket may comprise, incorporate or match any compatible or applicable optional feature described herein.

The rigid support structure may be a casing of a gas turbine engine, for example a fan casing or a core casing of a gas turbine engine. As such, the rigid dressing raft may replace some or all of the conventional dressings that would be provided to such casings of a gas turbine engine.

Indeed, a rigid dressing raft may be provided in any suitable location/position of a gas turbine engine, for example using at least one raft location fixing and support structure location fixing as described herein. Thus, by way of further example, the gas turbine engine may comprise a bypass flow duct formed between an engine core and an engine fan casing (the gas turbine engine may be a turbofan engine, for example); and the raft may form at least a part of a radially extending splitter (which may be referred to as a bifurcation) that extends across the bypass flow duct. In this way, a raft (which may be referred to as a splitter raft) may provide an electrical and/or fluid connection between a fan casing and an engine core.

According to an aspect, there is provided a method of connecting a rigid dressing raft of a gas turbine engine to a casing (for example a fan casing, which may be a fan containment casing) of the gas turbine engine, wherein the casing is the rigid support structure and the raft and casing comprise the respective location fixings described here. The method comprises aligning an axial direction of the casing with gravity; and lowering (for example by hand or using a machine, such as a crane) the rigid dressing raft towards the casing until the profiled surface of the raft location fixing engages with the corresponding profiled surface of the support structure location fixing. The direction in which the rigid dressing raft is lowered may be substantially aligned with gravity. Assembling a rigid dressing raft to a casing of a gas turbine engine in this manner may be particularly convenient, for example by ensuring that an operator or fitter merely has to guide the raft into the correct general position rather than having to lift and support it during fitting.

The rigid support structure may be a casing of a gas turbine engine comprising two generally annular or generally frusta-conical sections joined together at a flange connection. In arrangements in which the support structure location fixing is a dedicated bracket, the dedicated bracket may be connected to the flange connection of the casing. This may be a particularly convenient and stable platform on which to mount the bracket. The flanges of the generally annular or generally frusto-conical sections that are connected together at the flange connection may extend in a plane that is substantially perpendicular to the longitudinal axis of the casing.

In arrangements in which the support structure location fixing is a dedicated bracket, the dedicated bracket may comprise at least one bracket fixing hole having a longitudinal axis and which receives a fastener for fixing the bracket to the rigid support structure. The dedicated bracket may also comprise at least one raft fixing hole having a longitudinal axis and which receives a fastener that passes through a corresponding hole in the rigid dressing raft to thereby fix the rigid dressing raft to the bracket. The longitudinal axis of the or each raft fixing hole may be substantially perpendicular to the longitudinal axis of the or each bracket fixing hole. In arrangements in which the dedicated bracket is connected to a flange connection of the casing, the longitudinal axis of the or each raft fixing hole may be substantially radial with respect to the casing and the longitudinal axis of the or each bracket fixing hole may be substantially parallel to the axial direction of the casing.

The assembly may further comprise at least one additional fixing for fixing the rigid dressing raft to the rigid support structure. The additional fixing may be a different design to the raft location fixing and the complimentary support structure location fixing. For example, the additional fixing may be a standard, straightforward design that is relatively inexpensive to manufacture and/or lightweight. Such an additional fixing may be convenient for securing the rigid dressing raft to the rigid support structure once it has been located in position using the location fixings.

The raft location fixing and the complimentary support structure location fixing may be particularly useful during assembly, for locating the raft in the correct position relative to the support structure in a straightforward and/or accurate and/or rapid manner, and/or using fewer operators/fitters. Thus, the location fixing, comprising the raft location fixing and the complimentary support structure location fixing may be said to be an assembly aid.

The raft location fixing and the complimentary support structure location fixing may be permanent fixings that locate the rigid dressing raft relative to the rigid support structure during use of the assembly. Thus, the location fixings may be used both to locate the raft in the correct position relative to the rigid support structure and to fix it in that position during use. Alternatively, at least one of the raft location fixing and the complimentary support structure location fixing may be removable after the raft has been located in position and secured in position using alternative fixings.

According to an aspect, there is provided a gas turbine engine comprising an assembly having a rigid dressing raft and a rigid support structure as described and/or claimed herein.

Any suitable material may be used for the rigid material of the rigid dressing raft. For example, the rigid material may be a rigid composite material, such as an organic matrix composite. Such a rigid composite material may be particularly stiff and/or lightweight. Thus, a rigid composite raft may be used that has suitable mechanical properties, whilst being thin and lightweight, for example compared with some other materials. The rigid composite material may comprise any suitable combination of resin and fibre as desired for a particular application. For example, any of the resins and/or fibres described herein may be used to produce a rigid composite material for the rigid dressing raft. Any suitable fibres may be used, for example carbon fibres, glass fibres, aramid fibres, and/or para-aramid fibres. The fibres may be of any type, such as woven and/or chopped. Any suitable resin may be used, for example epoxy, BMI (bismaleimide), PEEK (polyetheretherketone), PTFE (polytetraflouroethylene), PAEK (polyaryletherketone), polyurethane, and/or polyamides (such as nylon).

As mentioned elsewhere herein, any component, system or part thereof (for example anything that may be considered an engine dressing) may be provided to or as part of the rigid dressing raft. For example, the rigid dressing raft may comprise at least a part of an electrical system. For example, the rigid dressing raft may comprise at least a part of the conductors that would conventionally form part of an electrical harness. The rigid dressing raft may comprise electrical conductors embedded in a rigid material, the electrical conductors forming a part of an electrical system of a gas turbine engine. Such a rigid dressing raft may be referred to as an electrical raft, a rigid electrical raft or an electrical harness raft.

A rigid dressing raft may comprise an electrical unit, or ECU, such as an Electronic Engine Controller (EEC) and/or an Engine Health Monitoring Unit (EMU). Thus, a surface of a rigid dressing raft may be used as a mounting surface for gas turbine engine components/systems, such as ancillary/auxiliary components/systems.

The rigid dressing raft may comprise at least part of a fluid system, for example at least a part of a fluid system of a gas turbine engine. For example, the rigid raft dressing may comprise at least one fluid passage mounted on or at least partially embedded in the rigid material of the rigid dressing raft. By way of example, such a fluid system may be for a gas (for example pneumatic or cooling gas/air) and/or liquid (for example a fuel, hydraulic and/or lubricant liquid).

As mentioned above, in general the use of one or more rigid dressing rafts (for example electrical rafts) may significantly reduce build time and/or the part count of an engine compared with the use of conventional dressings. The number and/or complexity of the operations required to assemble an engine (for example to assemble/install the electrical system for network) and/or other peripheral components, which may be referred to in general as engine dressing) may be reduced. For example, rather than having to install/assemble a great number of wires and/or wiring looms and/or fluid pipes/passages together on the engine installation, it may only be necessary to attach a relatively small number of rigid dressing rafts (such as electrical rafts), which themselves may be straightforward to handle, position, secure and connect. Thus, use of rigid dressing rafts (which may in general be referred to simply as rafts) in a gas turbine installation may reduce assembly time and/or reduce the possibility of errors occurring during assembly.

Use of rigid dressing rafts (for example electrical rafts) may provide significant advantages during maintenance, such as repair and overhaul. As discussed above, the rafts may be particularly quick and straightforward to assemble. The same advantages discussed above in relation to assembly apply to disassembly/removal from the gas turbine engine. Thus, any repair/overhaul that requires removal of at least a part of a system (such as an electrical and/or fluid system) may be simplified and/or speeded up through use of rafts. Use of rafts may allow maintenance procedures to be advantageously adapted. For example, some maintenance procedures may only require access to a certain portion of the gas turbine engine that only requires a part of the harness to be removed. It may be difficult and/or time consuming, or not even possible, to only remove the required part of a conventional harness from a gas turbine engine. However, it may be relatively straightforward to only remove the raft, for example by simply disconnecting it from the engine and any other rafts/components to which it is connected. Decreasing maintenance times has the advantage of, for example, reducing out-of service times (for example off-wing times for engines that are used on aircraft).

The build/assembly times may be additionally or alternatively reduced by pre-assembling and/or pre-testing individual and/or combinations of rafts and/or raft assemblies prior to engine assembly. This may allow the operation (for example the electrical and/or mechanical operation) of the rafts to be proven before installation, thereby reducing/eliminating the testing required during engine installation.

Rigid dressing rafts may be more easily packaged and/or more compact, for example than conventional dressings, such as electrical harnesses and/or pipes. The rafts can be made into a very wide range of shapes as desired. This may be achieved, for example, by manufacturing the rafts using a mould conforming to the desired shape. As such, each raft may be shaped, for example, to turn through a tighter corner (or smaller bend radius) than a conventional harness or pipe. The rafts may thus provide a particularly compact solution for transferring electrical signals and/or fluids around a gas turbine engine. The rafts may be readily shaped to conform to neighbouring components/regions of a gas turbine engine, for example components/regions to which the particular raft assembly is attached, such as a fan casing or a core casing.

Where the rigid dressing raft is an electrical raft, this may represent a particularly lightweight solution for transferring electrical signals around an engine. For example, an electrical raft may be lighter, for example significantly lighter, than a conventional harness required to transmit a given number of electrical signals. A plurality of conductors may be embedded in a single electrical raft, whereas in a conventional arrangement a large number of heavy, bulky wires, usually with insulating sleeves, would be required. The reduced weight may be particularly advantageous, for example, when used on gas turbine engines on aircraft.

Such electrical raft(s) (i.e. rigid dressing rafts comprising electrical conductors) may provide improved protection to the electrical conductors during manufacture/assembly of the raft/gas turbine installation, and/or during service/operation/maintenance of the gas turbine engine. This may result in lower maintenance costs, for example due to fewer damaged components requiring replacement/repair and/or due to the possibility of extending time intervals (or service intervals) between inspecting the electrical system, for example compared with a system using only conventional harnesses.

In any example of electrical raft (which, or course, is a type of rigid dressing raft), at least one of the electrical conductors embedded in the electrical raft may be an electrically conductive wire. The or each electrically conductive wire may be surrounded by an electrically insulating sleeve.

As mentioned elsewhere herein, at least some (for example a plurality) of the electrical conductors may be provided in a flexible printed circuit (FPC). Thus, at least some electrical conductors may be provided as electrically conductive tracks in a flexible substrate. The flexible printed circuit may be flexible before being embedded in the rigid material.

Providing the electrical conductors as tracks in a flexible printed circuit may allow the size of the resulting electrical raft to be reduced further and/or substantially minimized. For example, many different electrical conductors may be laid into a flexible printed circuit in close proximity, thereby providing a compact structure. The flexible substrate of a single flexible printed circuit may provide electrical and/or mechanical protection/isolation to a large number of electrical conductors.

Any given electrical raft may be provided with one or more electrical wires embedded therein (which may be sheathed) and/or one or more flexible printed circuits embedded therein. As such, a given electrical raft may have wires and flexible printed circuits laid therein.

It will be appreciated that the embedded component in the rigid dressing raft, such as electrical conductors (whether they are provided as embedded electrical wires or as conductive tracks in a flexible printed circuit embedded in the rigid material) and/or fluid pipes may be described as being fixed in position by the rigid material, for example relative to the rest of the electrical harness raft. It will also be appreciated that the embedded components may be said to be surrounded by the rigid material and/or buried in the rigid material and/or integral with (or integrated into) the rigid material.

An electrical raft may comprise one or more electrical connectors or sockets, which may be electrically connected to at least one embedded electrical conductor. The electrical connector or socket may allow electrical connection of the electrical raft to other electrical components, for example to other electrical rafts (either directly or indirectly, via an electrical cable or lead) or to electrical units (again, either directly or indirectly, via an electrical cable or lead). Such an electrical connector or socket may take any suitable form, and may be at least partially embedded in the rigid electrical raft.

There is also provided a method of servicing a gas turbine engine comprising a rigid dressing raft as described herein. The method comprises removing the raft from a gas turbine engine; and installing a second, pre-prepared, raft onto the gas turbine engine in place of the removed raft. The second, pre-prepared raft may be of the same, or a modified specification as the removed raft.

The removed raft may, for example, be tested and/or repaired (if necessary) once removed from the gas turbine engine. The removed and optionally tested and/or repaired raft may then be used as the replacement (or second) raft during another service, which may be of the same or a different engine.

The raft location fixing and the support structure location fixing may facilitate quick and accurate removal and refitting of the rafts.

According to an aspect, there is provided a gas turbine engine comprising an assembly as described herein, in which the rigid dressing raft is an electrical raft. The electrical raft of the assembly may form a first engine installation component. The gas turbine engine may comprise a second engine installation component comprising electrical conductors. At least one flexible cable may be electrically connected between the electrical raft (or first engine installation component) and the second engine installation component. Thus, the flexible cable(s) may electrically connect electrical conductors of the electrical raft with electrical conductors of the second engine installation component.

The second engine installation component may be, for example, an ECU, such as an EMU or EEC. Additionally or alternatively, the second engine installation component may be a further electrical raft or electrical raft assembly.

The environment of a gas turbine engine during operation may be particularly severe, with, for example, high levels of vibration and/or differential expansion between components as the temperature changes through operation and as the components move relative to each other. Providing at least one flexible cable to connect an electrical raft assembly to another component may allow the electrical rafts and/or components to accommodate vibration and/or relative movement, for example of the component(s)/assemblies to which they are attached/mounted during use. For example, the flexible cable(s) (where present) used to electrically connect electrical raft assemblies to other component(s) may have sufficient length to accommodate such vibration and/or movement during use.

For example, providing separate (for example more than one) electrical raft assemblies and connecting at least some (for example at least two) of them together using at least one flexible cable may allow the electrical rafts to accommodate vibration and/or relative movement of the component(s)/assemblies to which they are attached/mounted during use.

The electrical signals transferred by the conductors in the electrical raft, and around the engine using the electrical rafts/raft assemblies may take any form. For example, the electrical signals may include, by way of non-limitative example, electrical power and/or electrical control/communication signals and/or any other type of transmission through an electrical conductor. Transmission of signals around the engine may mean, transmission of signals between (to and/or from) any number of components/systems in the engine and/or components/system of a structure (such as an airframe) to which the gas turbine engine is (or is configured to be) connected/installed in. In other words, an electrical raft may be used to transfer/communicate any possible combination of electrical signals in any part of a gas turbine engine installation or a related (for example electrically and/or mechanically connected) structure/component/system.

An anti-vibration mount may be used to attach a raft to another component, thereby allowing the raft to be vibration isolated (or at least substantially vibration isolated).

The raft location fixing and the support structure location fixing may be constructed and arranged to provide a degree of vibration isolation. Additionally or alternatively, additional anti-vibration mounts may be provided between the support structure and the rigid dressing raft.

Using an anti-vibration mount to attach a raft to a gas turbine engine for example may reduce (or substantially eliminate) the amount (for example the amplitude and/or the number/range of frequencies) of vibration being passed to the raft from the gas turbine engine, for example during use. This may help to prolong the life of the raft. Furthermore, any other components that may be attached to the raft (as discussed above and elsewhere herein) may also benefit from being mounted to the gas turbine engine via the anti-vibration mounts, through being mounted on the raft. For example, the reduced vibration may help to preserve the electrical contact between an electrical raft and any electrical unit connected thereto. As such, any components (such as an electrical unit mounted to the electrical raft) that would conventionally be mounted directly to the gas turbine engine and require at least a degree of vibration isolation no longer require their own dedicated anti-vibration mount. Thus, the total number of anti-vibration mounts that are required to assemble an engine may be reduced. This may reduce the number of parts required and/or the time taken to assemble an engine or engine installation and/or reduce the total assembled weight and/or reduce the likelihood of errors occurring during assembly.

Furthermore, components that are conventionally mounted to an engine without anti-vibration mounts (for example because of the weight and/or cost penalty), but which are now mounted to a raft (for example to a mounting surface of the raft), may benefit from vibration isolation without any weight/cost/assembly time penalty. This may reduce the possibility of damage occurring to such components and/or increase their service life. Such components may include, for example, ignitor boxes (used to provide high voltage power to engine ignitors), and pressure sensors/switches, for example for fluid systems such as oil, air, fuel, pneumatics and/or hydraulics.

BRIEF DESCRIPTION OF THE DRAWINGS

The invention will now be described, by way of example only, with reference to the accompanying Figures, in which.

DETAILED DESCRIPTION OF THE PREFERRED EMBODIMENTS

Figure 2:
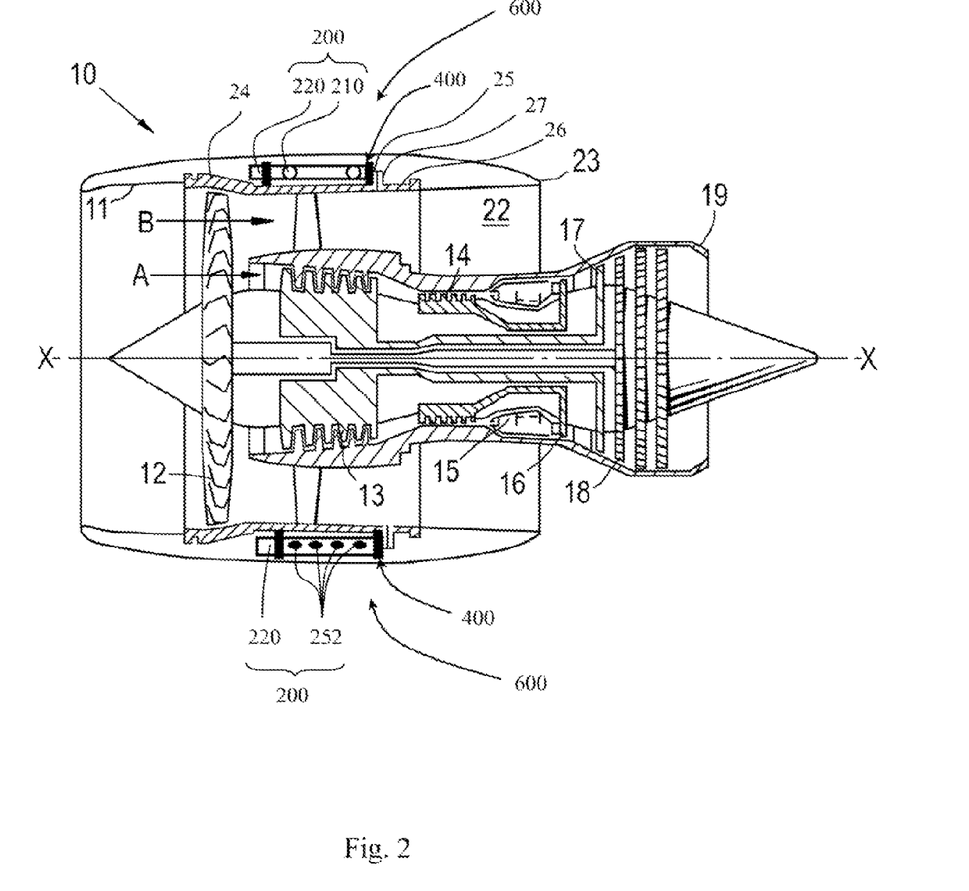
FIG. 2 shows a cross-section through a gas turbine engine having an assembly including a rigid dressing raft in accordance with the present invention.

With reference to FIG. 2, a ducted fan gas turbine engine generally indicated at 10 has a principal and rotational axis X-X. The engine 10 comprises, in axial flow series, an air intake 11, a propulsive fan 12, an intermediate pressure compressor 13, a high-pressure compressor 14, combustion equipment 15, a high-pressure turbine 16, and intermediate pressure turbine 17, a low-pressure turbine 18 and a core engine exhaust nozzle 19. The engine also has a bypass duct 22 and a bypass exhaust nozzle 23.

The gas turbine engine 10 works in a conventional manner so that air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through and thereby drive the high, intermediate and low-pressure turbines 16, 17, 18 before being exhausted through the nozzle 19 to provide additional propulsive thrust. The high, intermediate and low-pressure turbines 16, 17, 18 respectively drive the high and intermediate pressure compressors 14, 13 and the fan 12 by suitable interconnecting shafts.

The gas turbine engine 10 shown in FIG. 2 shows two assemblies 600 according to the present invention. As such, the gas turbine engine 10 is in accordance with the present invention. Each assembly 600 comprises a rigid dressing raft 200. The lower raft in FIG. 2 comprises at least one electrical conductor 252 embedded in a rigid material 220, which may be a rigid composite material, and is thus a rigid electrical raft. The rigid dressing rafts 200 (which may be referred to simply as rafts) may be used to transmit/transfer electrical signals (or electricity, including electrical power and/or electrical control signals) around the engine and/or to/from the engine 10 from other components, such as components of an airframe. The function and/or construction of each raft 200 and assembly 600 may be as described above and elsewhere herein. The upper raft 200 in FIG. 2 comprises fluid passages 210 embedded in the rigid material 220. It will be appreciated that in general rigid dressing raft 200 may comprise any combination of components of an electrical and/or a fluid system embedded therein or mounted thereon.

The rafts 200 in the assemblies 600 are located and attached to the fan case 24. The fan case 24 is an example of a support structure to which rafts 200 may be attached. At least part of the attachment is provided by respective location fixings 400. The location fixings 400 comprise engaging profiled surfaces that locate the raft 200 relative to the fan case 24. Each location fixing 400 comprises a fan case location fixing 410 and a raft location fixing 420, which are described in more detail in relation to FIGS. 3 and 4.

In the FIG. 2 example, the fan case 24 to which the raft 200 is attached is a forward fan case. The gas turbine engine 10 also comprises a rear fan case 26. The front fan case 24 comprises a flange 25, which is connected to a corresponding flange 27 on the rear fan case 26, thereby connecting the front and rear fan cases together. The raft 200 may be attached, using the location fixing 400, to a flange of a fan case, for example to the flange 25 of the front fan case 24, as in the FIG. 2 example.

Figure 3:
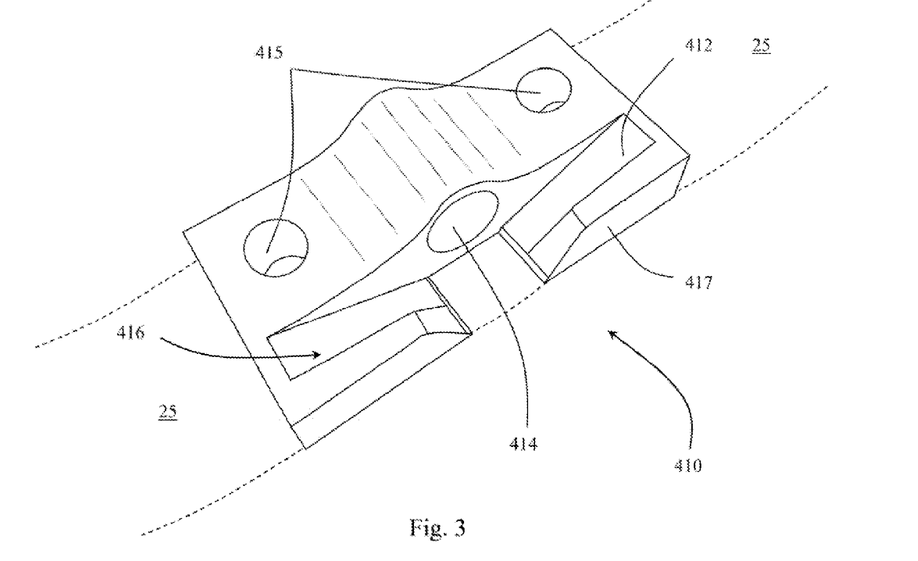
FIG. 3 shows a schematic view of a location fixing.

FIG. 3 shows a fan case location fixing 410 in greater detail. The fan case location fixing shown in FIG. 3 takes the form of a dedicated bracket 410 that, in use, is connected to a flange 25 of a fan case 24. Although in the example shown in FIG. 3, the fan case location fixing 410 is manufactured separately from the fan case 24 and then connected thereto, the bracket 410 may still be said to be a part of the fan case 24. Indeed, the fan case 24 is an example of a support structure to which the raft 200 is mounted, and the bracket 410 is an example of a support structure location fixing 410 used to locate the raft 200 relative to the support structure 24. In other examples, the location fixing 410 may be manufactured together with the support structure 24 of which it is a part.

The location fixing 410 is connected to the fan case 25 using fixings (such as bolts) that extend through bracket fixing holes 415 formed therethrough. The location fixing 410 comprises a profiled surface 412. The profiled surface 412 may comprise two ramps that generally face and extend towards each other, as in the FIG. 3 example. Any suitable profiled surface may be use, for example including a curved profile.

The profiled surface 412 may be bounded on either side so as to form a channel 416, as in the FIG. 3 example. In FIG. 3, the channel 416 has a lip 417 at one edge of the bracket 410 that forms one of the side edges of the channel 416. Providing a channel 416 may result in still further precise location of the raft 200 relative to the fan case 24, for example in another dimension.

Figure 4:
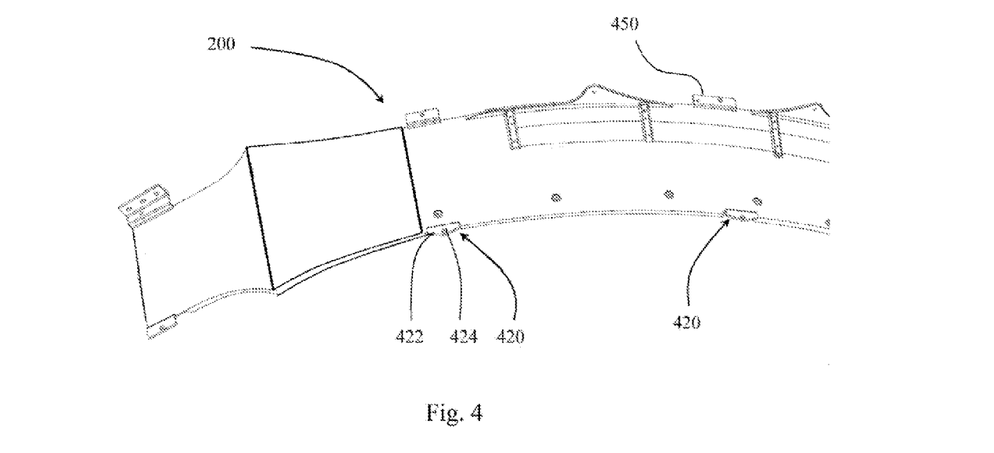
FIG. 4 shows a schematic of a rigid dressing raft including location fixing.

FIG. 4 shows a perspective view of a rigid dressing raft 200. The raft 200 comprises a raft location fixing 420. The raft location 420 has a profiled surface 422 that is complimentary to the profiled surface 412 of the bracket 410. The two complimentary profiled surfaces may be said to be the same shape, or have the same profile.

During assembly, the raft 200 is located onto the bracket 420 such that the profiled surfaces 412, 422 of the respective location fixings 410, 420 are aligned. It may be possible to only align the profiled surfaces 412, 422 in one particular position of the raft location fixing 420 relative to the bracket 410, thereby ensuring that the raft 200 is located in the desired position relative to the fan case 24.

Once the profiled surfaces 412, 422 are engaged so as to position the raft 200 relative to the fan case 24, the raft 200 may be secured in position using a fixing (such as a bolt) that passes through aligned holes 424, 414 in the raft location fixing 420 and the support structure location fixing 410 respectively. Thus, the location fixing 400 may be used to fix the raft 200 in position, as well as to locate it relative to the support structure 24.

The raft 200 may also be attached to the fan case 24 using other fixings, for example the fixings 450 shown in FIG. 4. These fixings 450 may be standard fixings, and may be used to secure the raft 200 in position once it has been located by the location fixings 400.

In the FIG. 4 example, the raft 200 is shown as having two raft location fixings 420. However, a raft may be provided with any suitable number of raft location fixings 420, and the corresponding support structure may be provided with the corresponding number of support structure location fixings 410. The number of location fixings may depend on the raft 200, for example the shape and size of the raft 200. For example, where the raft 200 is designed to be curved or wrapped around a structure (as with a raft provided to a case 24), it may be possible to locate the raft 200 with just one location fixing 400, although more than one may be used, as required. Where a flat raft 200 is used, more location fixings 400 may be desirable in order to ensure that the raft is located in a stable manner. For example in some cases three location fixings 400 may be used in order to ensure that the raft is securely located in 6 degrees of freedom.

In examples in which the raft 200 is located onto a gas turbine engine 10 during manufacture, the gas turbine engine 10 may have a "nose-down" orientation during manufacture. Thus, for example, the longitudinal axis X-X of the engine 10 may be aligned with gravity during manufacture. This may assist location of rafts 200 to the engine, for example onto the fan case 24. For example, the raft location fixing 420 may be lowered, and guided, onto the fan case location fixing 410 (for example using a crane or by hand, depending on size and/or shape) so as their respective profiled surfaces 412, 422 engage to locate the raft 200 in position. Once the engine has been assembled (or at least some of the assembly operations have been completed), the engine 10 may be rotated so as to have its longitudinal axis substantially horizontal.

Figure 5:
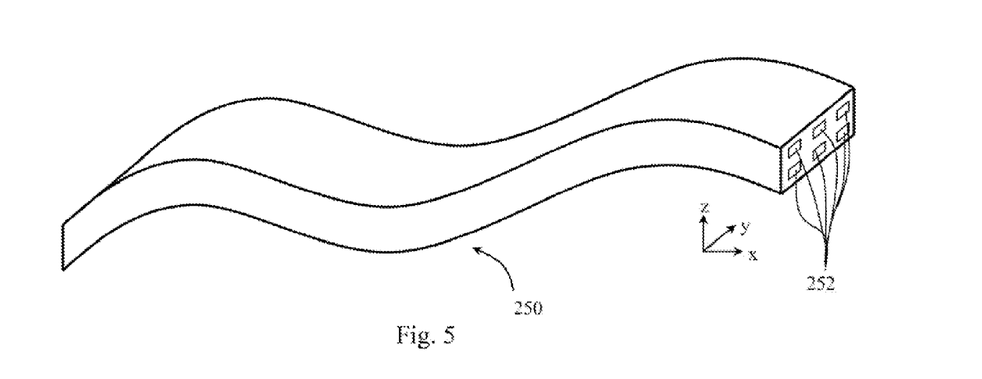
FIG. 5 shows a perspective view of a flexible printed circuit.
Figure 6:
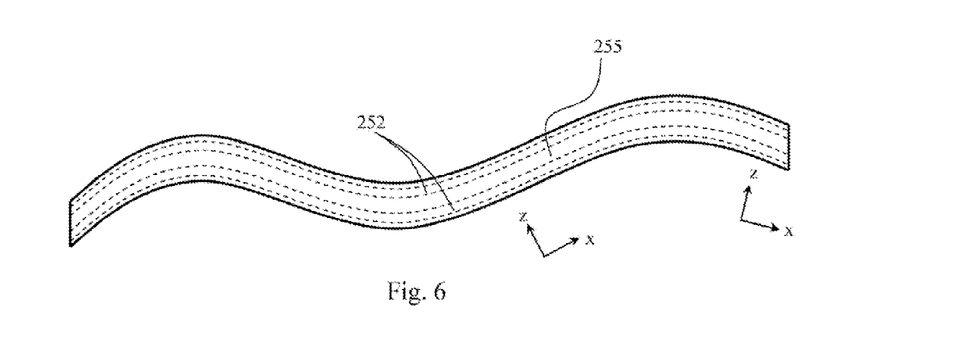
FIG. 6 shows a side view of the flexible printed circuit of FIG. 5.

As mentioned herein, the rigid dressing raft 200 may comprise electrical conductors 252 (for example in the form of electrical wires and/or flexible PCBs) embedded in the rigid material 220. Such a rigid dressing raft may be referred to as a rigid electrical raft 200. An example of an FPC 250 in which the electrical conductors 252 may be provided is shown in greater detail in FIGS. 5 and 6. FIG. 5 shows a perspective view of the FPC 250, and FIG. 6 shows a side view.

Such an FPC 250 may comprise a flexible (for example elastically deformable) substrate 255 with conductive tracks 252 laid/formed therein. The FPC 250 may thus be deformable. The FPC 250 may be described as a thin, elongate member and/or as a sheet-like member. Such a thin, elongate member may have a major surface defined by a length and a width, and a thickness normal to the major surface. In the example shown in FIGS. 5 and 6, the FPC 250 may extend along length in the x-direction, a width in the y-direction, and a thickness (or depth or height) in the z-direction. The x-direction may be defined as the axial direction of the FPC. Thus, the x-direction (and thus the z-direction) may change along the length of the FPC 250 as the FPC is deformed. This is illustrated in FIG. 5. The x-y surface(s) (i.e. the surfaces formed by the x and y directions) may be said to be the major surface(s) of the FPC 250. In the example shown in FIGS. 5 and 6, the FPC 250 is deformable at least in the z direction, i.e. in a direction perpendicular to the major surface. FPCs may be additionally of alternatively deformable about any other direction, and/or may be twisted about any one or more of the x, y, or z directions.

The flexible substrate 255 may be a dielectric. The substrate material may be, by way of example only, polyamide. As will be readily apparent, other suitable substrate material could alternatively be used.

The conductive tracks 252, which may be surrounded by the substrate 255, may be formed using any suitable conductive material, such as, by way of example only, copper, copper alloy, tin-plated copper (or tin-plated copper alloy), silver-plated copper (or silver-plated copper alloy), nickel-plated copper (or nickel-plated copper alloy) although other materials could alternatively be used. The conductive tracks 252 may be used to conduct/transfer electrical signals (including electrical power and electrical control signals) through the rigid raft assembly (or assemblies) 200, for example around a gas turbine engine 10 and/or to/from components of gas turbine engine and/or an airframe attached to a gas turbine engine.

The size (for example the cross-sectional area) and/or the shape of the conductive tracks 252 may depend on the signal(s) to be transmitted through the particular conductive track 252. Thus, the shape and/or size of the individual conductive tracks 252 may or may not be uniform in a FPC 250.

The example shown in FIGS. 5 and 6 has 6 conductive tracks 252 running through the substrate 255. However, the number of conductive tracks 252 running through a substrate 255 could be fewer than 6, or greater than 6, for example tens or hundreds of tracks, as required. As such, many electrical signals and/or power transmission lines may be incorporated into a single FPC 250.

A single FPC 250 may comprise one layer of tracks, or more than one layer of tracks, for example, 2, 3, 4, 5, 6, 7, 8, 9, 10 or more than 10 layers of tracks. An FPC may comprise significantly more than 10 layers of tracks, for example at least an order of magnitude more layers of tracks. In this regard, a layer of tracks may be defined as being a series of tracks that extend in the same x-y surface. Thus, the example shown in FIGS. 5 and 6 comprises 2 layers of tracks, with each layer comprising 3 tracks 252.

A rigid dressing raft 200 as described and claimed herein may be manufactured using any suitable method. For example, the rigid material 220 may initially be provided as layers of flexible material, such as (by way of example only) layers of fibre and resin compound. This flexible material may be placed into a mould, for example having a desired shape. Other components (such as fluid pipes 210 and/or electrical conductors 252, which may be embedded in a FPC 250) may also be placed into the mould, for example between layers of the flexible material from which the rigid material 220 is ultimately formed. Parts of the mould may have any suitable form and/or construction, for example that could be readily removed when the raft 200 is formed into the desired shape. The raft location fixing 420 may be manufactured at the same time as the rest of the raft 200 (for example using the same material and/or process, for example using a suitably shaped mould), or the raft location fixing 420 may be manufactured separately from the rest of the raft 200 and subsequently fixed thereto.

Figure 7:
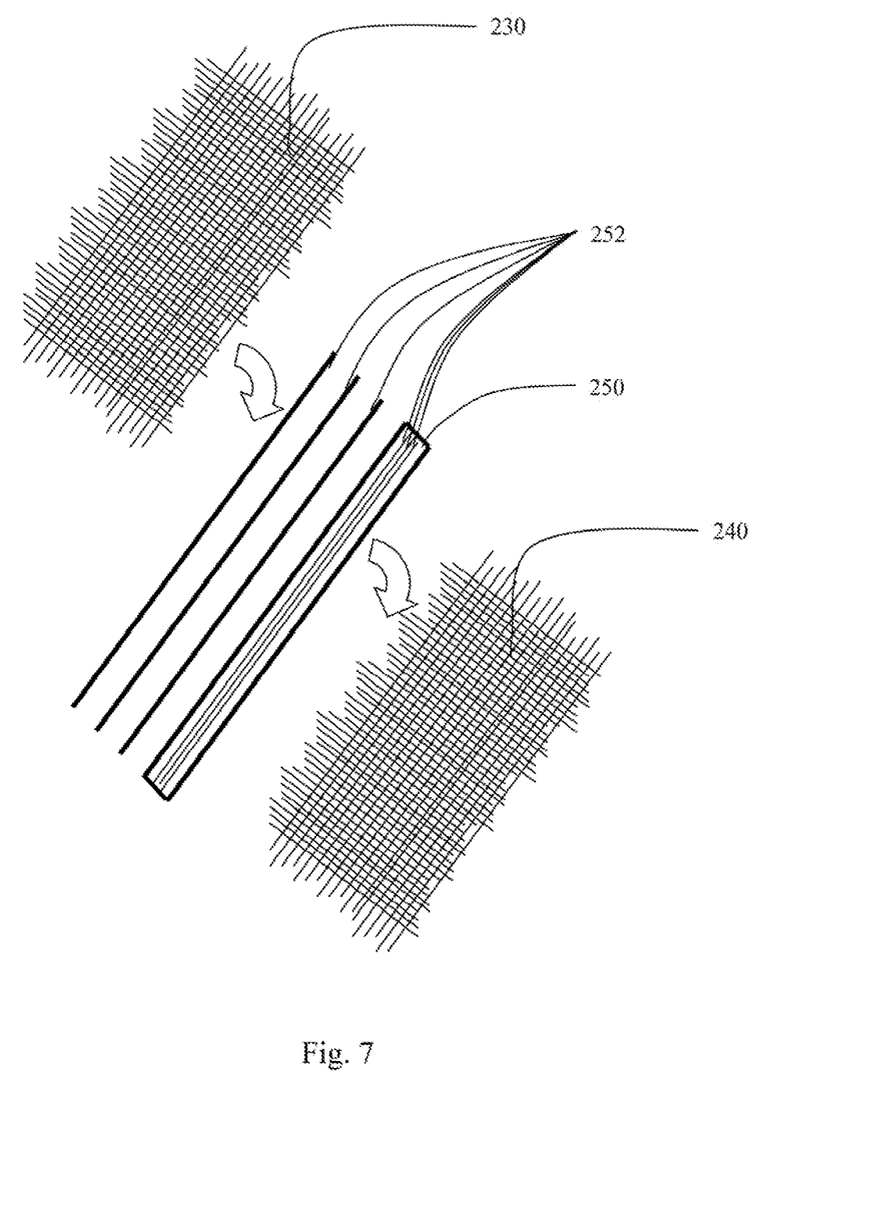
FIG. 7 shows schematic of an electrical raft prior to assembly.

FIG. 7 shows components of an example of an electrical raft 200 prior to one method of construction. The electrical conductors 252 are provided between two layers of material 230, 240 that, after construction, form the rigid material 220. Some of the electrical conductors 252 are provided in an FPC 250. The material 230, 240 may be a fibre and resin compound, as described elsewhere herein. Such a fibre and resin compound may, after suitable treatment (for example heat treatment), produce the rigid composite material 220. In the example of FIG. 12, the fibre and resin compound is formed of a sheet of interwoven fibres, or strands. The strands in FIG. 12 extend in perpendicular directions, although the strands may extend in any one or more directions as required. The strands/fibres may be pre-impregnated (or "pre-pregged") with the resin.

The method of construction illustrated and described in relation to FIG. 7 could be used for any rigid dressing raft 200. For example, fluid pipes 210 may be laid between the pre-pregged sheets in addition to or instead of the electrical conductors 252.

Prior to any treatment, both the first and second layers 230, 240 and the electrical conductors 252 (or other embedded components) may be flexible, for example supple, pliable or malleable. As such, when the layers 230, 240 and the electrical conductors 252 are placed together, they may be moulded, or formed, into any desired shape. For example, the layers 230, 240 and the electrical conductors 252 may be placed into a mould (which may be of any suitable form, such as a glass or an aluminium mould) having the desired shape. The desired shape may be, for example, a shape that corresponds to (for example is offset from) a part of a gas turbine engine, such as, by way of example only, at least a part of a casing, such as an engine fan casing or engine core casing. This may enable the final raft to adopt shapes that are curved in two-dimensions or three-dimensions, and/or to include the location fixings 400.

Any suitable method could be used to produce the raft 200. For example, the strands/fibres need not be pre-impregnated with the resin. Instead, the fibres/strands could be put into position in a dry state, and then the resin could be fed (or pumped) into the mould, for example around any embedded components. Such a process may be referred to as a resin transfer method. In some constructions no fibre may be used at all in the rigid material 220.

Figure 8:
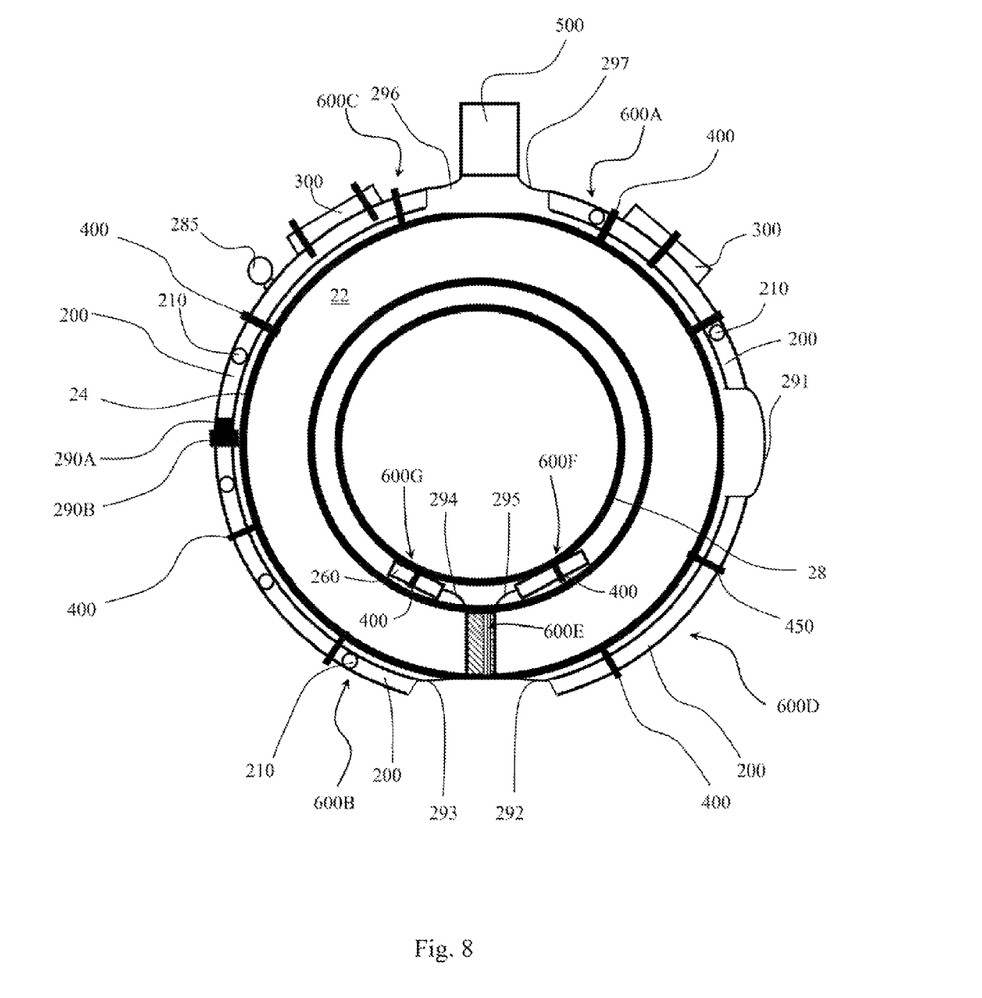
FIG. 8 shows a cross-section normal to the axial direction through a gas turbine engine according to an embodiment of the invention.

FIG. 8 is a schematic showing a cross-section perpendicular to the direction X-X of a gas turbine engine comprising assemblies (which may be electrical raft assemblies) 600A-600G. Each of the assemblies 600A-600G comprises a rigid dressing raft 200 and at least one location fixing 400 (which are not shown in detail in FIG. 8), which locates the respective rigid dressing raft 200 to a part of the gas turbine engine 10. The location fixing 400 comprises a raft location fixing 420 and a support structure location fixing 410 as described by way of example elsewhere herein. Any one of the assemblies 600A-600G (which may collectively be referred to as assemblies 600) may comprise a standard fixing 450, as shown by way of example for the assembly 600D.

The support structure to which the rigid dressing raft 200 is mounted is part of a fan case 24 for the assemblies 600A-600D, part of a bifurcation splitter that radially crosses a bypass duct 22 for the assembly 600E and part of an engine core case 28 for the assemblies 600F and 600G. However, it will be appreciated that an assembly 600 could be mounted in any suitable and/or desired location on a gas turbine engine 10.

In FIG. 8, two assemblies 600A, 600C are shown as having an electrical unit 300 mounted on the respective raft 200. However, any (or none) of the assemblies 600A-600G may have an electrical unit 300 mounted on the respective raft 200.

As mentioned herein, each of the rafts 200 associated with the assemblies 600A-600G shown in FIG. 8 may comprise one or more electrical conductors 252 embedded therein. However, any one or more of the rigid dressing rafts 200 may not comprise electrical conductors 252. Such a raft may have other components/systems (such as, by way of example only, fluid systems, such as pipes) mounted thereon and/or embedded therein. Thus, for example, a gas turbine engine in accordance with the present invention may comprise an electrical raft 200 and/or a non-electrical raft 200.

At least one of the raft assemblies 600A-600G may be replaced with an assembly that does not comprise a location fixing 400. For example, the assemblies 600E-600G may be replaced with assemblies that do not comprise a location fixing 400. Thus, the gas turbine engine may comprise at least one rigid dressing raft 200 attached to the engine using at least one location fixing 400, and at least one raft attached the engine without using a location fixing 400.

The arrangement of assemblies 600A-600G shown in FIG. 8 is by way of example only. Alternative arrangements, for example in terms of number, size, shape and/or positioning, of assemblies 600A-600G may be used. For example, there need not be 7 assemblies 600, the assemblies 600 may or may not be connected together, and the rafts 200 could be provided to (for example mounted on) any one or more components of the gas turbine engine. Purely by way of example only, connection between assemblies 600A-600D mounted on the fan casing 24 to the assemblies 600F, 600G mounted on the core casing 28 may be provided at least in part by means other than an additional assembly 600E, for example using wire conductors with insulating sleeves. By way of further example, one or more assemblies 600 may additionally or alternatively be provided to the nose cone, structural frames or elements within the engine (such as "A-frames"), the nacelle, the fan cowl doors, and/or any connector or mount between the gas turbine engine 10 and a connected structure (which may be at least a part of a structure in which the gas turbine engine 10 is installed), such as the pylon 500 between the gas turbine engine 10 and an airframe (not shown).

Any one or more of the rigid dressing rafts 200 of the assemblies 600A-600G may have a fluid passage 210 embedded therein and/or provided thereto. The fluid passage 210 may be part of a fluid system, such as a gas (for example pneumatic or cooling gas/air) and/or liquid (for example a fuel, hydraulic and/or lubricant liquid). In the FIG. 8 example, three of the rafts (of assemblies 600A, 600B, 600C) comprise a fluid passage 210 at least partially embedded therein. The raft 200 of assembly 600C also has a fluid passage 285 (which may be for any fluid, such as those listed above in relation to embedded passage 210) mounted thereon. Such a mounted fluid passage 285 may be provided to any raft, such as those of assemblies 600A-600G shown in FIG. 8. The fluid passages 210, 285 shown in FIG. 8 may be oriented in an axial direction of the engine 10. However, fluid passages may be oriented in any direction, for example axial, radial, circumferential or a combination thereof.

Any of the assemblies 600A-600G (or the respective rafts 200 thereof) may have any combination of mechanical, electrical and/or fluid connections to one or more (for example 2, 3, 4, 5 or more than 5) other components/systems of the gas turbine engine 10 and/or the rest of the gas turbine engine 10. Examples of such connections are shown in FIG. 8, and described below, but other connectors may be used. For example, assemblies 600 (and/or non-electrical rafts) may be connected together (or to other components) using any combination of electrical, fluid and/or mechanical connectors. Thus, any of the electrical connections 290A/290B, 291-297 shown in FIG. 8 may be any combination of electrical, fluid and/or mechanical connection. Alternatively, assemblies 600 (and/or rafts 200) may be standalone, and thus may have no connection to other rafts or components.

A connection 291 is shown between the rafts of the assemblies 600A and 600D. The connection 291 may comprise an electrical connection. Such an electrical connection may be flexible and may, for example, take the form of a flexible printed circuit such as the flexible printed circuit 250 shown in FIGS. 5 and 6. Such a flexible electrical connection may be used to electrically connect any assembly 600 that is an electrical raft assembly 600 to any other component, such as another electrical raft assembly 600. A connection 297 (which may be or comprise an electrical connection) is provided between the electrical raft of the assembly 600A and a part of an airframe, or airframe installation 500, which may, for example, be a pylon. Similarly, a fluid and/or mechanical connection 296 may additionally or alternatively be provided between the airframe 500 and another raft of the assembly 600C. As shown in FIG. 8, other electrical and/or fluid connections 292, 293, 294, 295 may be provided between rafts 200 (or assemblies 600) and other components, such as other rafts 200 (or assemblies 600).

A direct connection 290A, 290B may be provided, as shown for example between the rafts of the assemblies 600B and 600C in the FIG. 8 arrangement. Such a direct connection 290A, 290B may comprise a connector 290A provided on (for example embedded in) one raft 200 connected to a complimentary connector 290B provided on (for example embedded in) another raft 200. Such a direct connection 290A, 290B may, for example, provide fluid and/or electrical connection between the two rafts assemblies 600B, 600C.

Where reference is made herein to a gas turbine engine, it will be appreciated that this term may include a gas turbine engine/gas turbine engine installation and optionally any peripheral components to which the gas turbine engine may be connected to or interact with and/or any connections/interfaces with surrounding components, which may include, for example, an airframe and/or components thereof. Such connections with an airframe, which are encompassed by the term 'gas turbine engine' as used herein, include, but are not limited to, pylons and mountings and their respective connections. The gas turbine engine itself may be any type of gas turbine engine, including, but not limited to, a turbofan (bypass) gas turbine engine, turbojet, turboprop, ramjet, scramjet or open rotor gas turbine engine, and for any application, for example aircraft, industrial, and marine application. Rigid dressing rafts 200 and/or assemblies 600 such as any of those described and/or claimed herein may be used as part of any apparatus, such as any vehicle, including land, sea, air and space vehicles, such as motor vehicles (including cars and busses), trains, boats, submarines, aircraft (including aeroplanes and helicopters) and spacecraft (including satellites and launch vehicles).

It will be appreciated that many alternative configurations and/or arrangements of rigid dressing rafts 200 and/or assemblies 600 and gas turbine engines 10 comprising rigid dressing rafts 200 and/or assemblies 600 other than those described herein may fall within the scope of the invention.

For example, alternative arrangements of rafts 200 (far example in terms of the arrangement, including number/shape/positioning/constructions, of mounting fixtures, the arrangement/shape/positioning/construction of the rafts 200, the type and/or positioning of components (if any) mounted to/embedded in the rafts 200, the rigid material 220 and any electrical conductors 252) may fall within the scope of the invention and may be readily apparent to the skilled person from the disclosure provided herein. Alternative arrangements of connections (for example mechanical, electrical and/or fluid) between the rafts and/or assemblies and between the rafts or raft assemblies and other components may fall within the scope of the invention and may be readily apparent to the skilled person from the disclosure provided herein. Furthermore, any feature described and/or claimed herein may be combined with any other compatible feature described in relation to the same or another embodiment.

I claim:

1. An assembly for a gas turbine engine comprising:
a rigid dressing raft comprising at least a first part of a component or system of the gas turbine engine; and
a rigid support structure that forms a second part of the gas turbine engine, wherein:
the rigid dressing raft comprises a raft location fixing and the rigid support structure comprises a complimentary support structure location fixing;
the raft location fixing and the complimentary support structure location fixing comprise corresponding profiled surfaces that are engaged so as to locate the rigid dressing raft relative to the rigid support structure;
one of the raft location fixing and the support structure location fixing comprises a channel with its respective profiled surface forming the base of the channel;
the other of the raft location fixing and the support structure location fixing comprises a location tab that locates inside the channel such that its respective profiled surface engages with the profiled surface forming the base of the channel; and
the rigid dressing raft comprises electrical conductors embedded in a rigid material, the electrical conductors forming a part of an electrical system of the gas turbine engine.

2. An assembly according to claim 1, wherein the location fixing comprising the channel is the support structure location fixing.

3. An assembly according to claim 1, wherein the support structure location fixing is a dedicated bracket that is connected to the rigid support structure.

4. An assembly according to claim 3, wherein:
the rigid support structure is a casing of a gas turbine engine comprising two generally annular or generally frusto-conical sections joined together at a flange connection; and
the dedicated bracket is connected to the flange connection of the casing.

5. An assembly according to claim 3, wherein the dedicated bracket comprises:
at least one bracket fixing hole having a longitudinal axis and which receives a fastener for fixing the bracket to the rigid support structure; and
at least one raft fixing hole having a longitudinal axis and which receives a fastener that passes through a corresponding hole in the rigid dressing raft to thereby fix the rigid dressing raft to the bracket, wherein:
the longitudinal axis of the or each raft fixing hole is substantially perpendicular to the longitudinal axis of the or each bracket fixing hole.

6. An assembly according to claim 1, wherein the rigid support structure is a casing of a gas turbine engine.

7. An assembly according to claim 1, wherein the rigid support structure is a fan casing of a gas turbine engine.

8. An assembly according to claim 1, wherein the rigid dressing raft comprises at least one fluid passage mounted on or at least partially embedded in a rigid material the fluid passage forming a part of a fluid system of a gas turbine engine.

9. An assembly according to claim 1, further comprising at least one additional fixing for fixing the rigid dressing raft to the rigid support structure, wherein the additional fixing is a different design to the raft location fixing and the complimentary support structure location fixing.

10. An assembly according to claim 1, wherein the raft location fixing and the complimentary support structure location fixing are permanent fixings that locate the rigid dressing raft relative to the rigid support structure during use of the assembly.

11. A gas turbine engine comprising an assembly according to claim 1.

12. A method of connecting a rigid dressing raft of a gas turbine engine to a rigid support structure of the gas turbine engine, the rigid dressing raft comprising at least a part of a component or system of the gas turbine engine, and the method comprising:
engaging a profiled surface of a raft location fixing of the rigid dressing raft with a corresponding profiled surface of a complimentary support structure location fixing of the rigid support structure so as to locate the rigid dressing raft relative to the rigid support structure, wherein
one of the raft location fixing and the support structure location fixing comprises a channel with its respective profiled surface forming the base of the channel;
the other of the raft location fixing and the support structure location fixing comprises a location tab that locates inside the channel such that its respective profiled surface engages with the profiled surface forming the base of the channel; and
the rigid dressing raft comprises electrical conductors embedded in a rigid material, the electrical conductors forming a part of an electrical system of the gas turbine engine.

13. A method of connecting a rigid dressing raft of a gas turbine engine to a rigid support structure of the gas turbine engine according to claim 12, wherein the rigid support structure is a casing of the gas turbine engine, and the method further comprises:
aligning an axial direction (X-X) of the casing with gravity; and
lowering the rigid dressing raft towards the casing until the profiled surface of the raft location fixing engages with the corresponding profiled surface of the support structure location fixing.

* * * * *